United States Patent
DePue et al.

(10) Patent No.: US 8,267,428 B2
(45) Date of Patent: Sep. 18, 2012

(54) ENERGY ABSORBING COUNTERMEASURE

(75) Inventors: Todd DePue, Brighton, MI (US); Arun Chickmenahalli, Ann Arbor, MI (US); Michael W. Cass, Lenox, MI (US); Robert Adams, Ann Arbor, MI (US)

(73) Assignee: International Automotive Components Group North America, Inc, Dearborn, MI (US)

( * ) Notice: Subject to any disclaimer, the term of this patent is extended or adjusted under 35 U.S.C. 154(b) by 198 days.

(21) Appl. No.: 12/642,460

(22) Filed: Dec. 18, 2009

(65) Prior Publication Data
US 2011/0148086 A1   Jun. 23, 2011

(51) Int. Cl.
B60R 21/045 (2006.01)
B60R 21/04 (2006.01)
B60K 37/00 (2006.01)

(52) U.S. Cl. .......... 280/752; 280/751; 296/187.05; 296/193.02

(58) Field of Classification Search ............ 280/751, 280/752, 748; 296/203.02, 146.6, 209, 187.09, 296/187.12, 193.02, 187.05, 70, 72; 293/120, 293/121, 122; 188/371, 372, 376, 377
See application file for complete search history.

(56) References Cited

U.S. PATENT DOCUMENTS

| | | | | |
|---|---|---|---|---|
| 5,096,223 A * | 3/1992 | Tekelly et al. | ............. | 280/748 |
| 5,312,133 A | 5/1994 | Pietila et al. | | |
| 5,364,159 A | 11/1994 | Kelman et al. | | |
| 5,813,719 A * | 9/1998 | Kowalski | ............. | 296/146.6 |
| 5,927,796 A * | 7/1999 | Schmieder | ............. | 296/192 |
| 6,142,522 A | 11/2000 | Bossenmaier et al. | | |
| 6,273,495 B1 | 8/2001 | Haba et al. | | |
| 6,302,472 B1 * | 10/2001 | Rahmstorf et al. | ........ | 296/146.5 |
| 6,609,727 B2 | 8/2003 | Figlioli et al. | | |
| 6,682,128 B2 * | 1/2004 | Carroll et al. | ............ | 296/187.03 |
| 6,752,450 B2 * | 6/2004 | Carroll et al. | ............ | 296/187.03 |
| 6,783,156 B2 | 8/2004 | Chickmenahalli et al. | | |
| 6,948,738 B2 | 9/2005 | Garnweidner et al. | | |
| 7,025,396 B2 * | 4/2006 | Omura et al. | ............ | 293/102 |
| 7,201,434 B1 | 4/2007 | Michalak et al. | | |
| 7,291,378 B2 | 11/2007 | Cowelchuk et al. | | |
| 7,393,013 B2 | 7/2008 | Best et al. | | |
| 7,481,457 B2 | 1/2009 | Best et al. | | |
| 7,677,640 B2 * | 3/2010 | Dix et al. | ............ | 296/146.7 |
| 7,708,313 B2 * | 5/2010 | Haba et al. | ............ | 280/751 |
| 7,971,903 B2 * | 7/2011 | Haba et al. | ............ | 280/751 |
| 2006/0232055 A1 * | 10/2006 | Cappabianca et al. | ........ | 280/752 |
| 2007/0046010 A1 * | 3/2007 | Haba et al. | ............ | 280/751 |
| 2010/0253114 A1 * | 10/2010 | Ohmiya et al. | ............ | 296/187.05 |
| 2012/0049546 A1 * | 3/2012 | Chickmenahalli et al. | ... | 293/132 |
| 2012/0049569 A1 * | 3/2012 | Chickmenahalli et al. | ........ | 296/187.05 |

FOREIGN PATENT DOCUMENTS

WO   WO-2009093564 A1 *   7/2009

* cited by examiner

*Primary Examiner* — Paul N Dickson
*Assistant Examiner* — Joselynn Y Sliteris
(74) *Attorney, Agent, or Firm* — Grossman, Tucker, Perreault + Pfleger, PLLC (57) ABSTRACT

An energy absorber for a vehicle includes an elongate member having lateral and longitudinal axes. The elongate member may include one or more channels which are oriented to have walls which extend in the general direction of the lateral axis. An upper surface of at least one of the channels may have an engagement feature that may be configured to engage a stationary member of a vehicle when an impact force brings the engagement feature into contact with the stationary member. The channels may be configured to deform and collapse to absorb at least some of the impact force.

25 Claims, 4 Drawing Sheets

ENERGY ABSORBING COUNTERMEASURE

FIELD

Embodiments of the present disclosure relate to the field of absorbing energy acting on a person during impact, particularly in the case of motor vehicles.

BACKGROUND

Energy absorbers may aid in preventing injury and saving lives by providing cushioning, by extending the period of time over which the force of an impact may act on the body of a person and/or by diminishing the peak force that a person may be subjected to over that period of time. In one exemplary application, an energy absorber may be positioned in the instrument panel of a vehicle in an area likely to be impacted by the knees of either of the vehicle driver or front passenger. One such prior art energy absorber may comprise five separate metal pieces which may be attached to a back side of the instrument panel (i.e., they are not visible from inside the cabin of the vehicle) and also attached to a structural cross member that is rigidly mounted to the frame of the vehicle. Although such an energy absorber may be effective, the use of metal in its construction may be expensive and may add an unacceptable amount of weight to the vehicle. Further, assembling separate components to form a single energy absorber may be complex and may require an excessive amount of labor. It may therefore be desirable to provide a one-piece energy absorber made of a light weight material.

Additionally, vehicle occupants may be of different weights and sizes which may further complicate the management of energy during an impact. Providing an energy absorber capable of effectively cushioning a 220 lb., 6' 5" person may offer too much resistance to effectively cushion a 5' 0", 100 lb. person. Conversely, an energy absorber capable effectively cushioning the impact of the 5' 0", 100 lb. person may offer an insufficient level of resistance to effectively cushion the 6' 5", 220 lb. person during a collision. It would therefore be desirable to provide a single energy absorber that can effectively cushion persons of varying size and weight.

SUMMARY

Various embodiments of an energy absorber are disclosed herein. In a first embodiment, the energy absorber may comprise an elongate member having a lateral axis and a longitudinal axis. The elongate member may include channels which are oriented to have walls which extend in the general direction of the lateral axis of the elongate member. An upper surface of at least one of the channels may have a first engagement feature that is configured to engage a stationary member. In this first embodiment, the at least one channel having the first engagement feature may be configured to at least partially collapse when an impact force causes the at least one channel to engage the stationary member.

In an implementation of the first embodiment, an upper surface of a second one of the channels may have a second engagement feature that is configured to engage the stationary member. The second one of the channels may be configured to at least partially collapse when an impact force causes the second one of the channels to engage the stationary member.

In another implementation of the first embodiment, the first engagement feature may comprise a depression defined in the upper surface. In a variation of this implementation, the depression may comprise a semicircular arc.

In another implementation of the first embodiment, the at least one channel may comprise a generally planar upper surface and a pair of spaced apart laterally extending walls. In a variation of this implementation, one or more of the walls may include an opening extending therethrough. In a further variation, each opening may be asymmetrical. In another variation, the center of each opening may be spaced apart from a center of the respective wall in which the opening is included.

In another implementation of the first embodiment, the elongate member further may include a longitudinally extending strap connecting at least two adjacent channels.

In another implementation of the first embodiment, at least two channels may be separated by a generally planar base mounting member that may be configured to receive a fastener, the fastener located along an edge of the base mounting member.

In another implementation of the first embodiment, at least one of the channels may comprise a generally planar upper surface, a laterally oriented first wall connected to the upper surface, a laterally oriented second wall connected to the upper surface, the second wall being spaced apart from the first wall, and a longitudinally oriented third wall connecting the first wall to the second wall. In a variation of this implementation, the third wall may include an opening extending therethrough. In another variation of this implementation, the channel having the third wall further may comprise a longitudinally oriented fourth wall spaced apart from the third wall. The fourth wall may connect the first wall to the second wall. In a variation of this implementation, the fourth wall may include an opening extending therethrough.

In another implementation of the first embodiment, at least one of the channels may comprise a generally planar upper surface, a laterally oriented first wall connected to the upper surface, the first wall including a first opening extending therethrough, a laterally oriented second wall connected to the upper surface, the second wall including a second opening extending therethrough, the second wall being spaced apart from the first wall (by said planar upper surface), and a longitudinally oriented third wall connecting the first wall to the second wall. In a variation of this implementation, a center of the first opening may be offset in a first direction from a center of the first wall and a center of the second opening may be substantially axially aligned with a center of the first opening. In another variation of this implementation, the third wall may include an opening extending therethrough.

In a related embodiment, the energy absorber may comprise an elongate member having a lateral axis and a longitudinal axis. The elongate member may include a first channel and a second channel. The first and the second channels may be oriented to have walls which extend in the general direction of the lateral axis of the elongate member. An upper surface of the first channel may include a first depression that may be configured to engage a stationary member. An upper surface of the second channel may include a second depression configured to engage the stationary member. A laterally oriented first wall may be connected to the upper surface of the first channel. A laterally oriented second wall may be spaced apart from the first wall. The second wall may be connected to the upper surface of the first channel. A laterally oriented third wall may be connected to the upper surface of the second channel. A laterally oriented fourth wall may be spaced apart from the third wall. The fourth wall may be connected to the upper surface of the second channel. The first wall, the second wall, the third wall, and the fourth wall each may include an opening that extends therethrough. In this second embodiment, the first and the second channels may be configured to at least partially collapse in response to an impact force when the first depression and the second depression engage a stationary member.

In a related embodiment, an instrument panel for installation into a vehicle having a structural cross member that may be positioned forward of the instrument panel is disclosed. The instrument panel may comprise a body that may be configured to be attached to an automotive vehicle. An energy absorber may be attached to the backside of the body. The energy absorber may have an elongate member having a lateral axis and a longitudinal axis. The elongate member may include channels which are oriented to have walls which extend in the general direction of the lateral axis. An upper surface of at least one of the channels may have a first engagement feature that may be configured to engage the structural cross member. In this third embodiment, the energy absorber may be attached to the body such that the engagement feature may be positioned to engage with the structural cross member in the event of a front end collision of the vehicle. The at least one channel having the first engagement feature may be configured to at least partially collapse in response to an impact force when the first engagement feature engages the structural cross member.

BRIEF DESCRIPTION OF THE DRAWINGS

The description herein makes reference to the accompanying drawings wherein like reference numerals refer to like parts throughout the several views, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention

DETAILED DESCRIPTION

Detailed embodiments of the present disclosure are disclosed herein; however, it is to be understood that the disclosed embodiments are merely exemplary of the disclosure that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure.

Energy absorbers have been disclosed in U.S. Application Publication No. 2007/0046010. That Application is commonly assigned to the assignee of the present disclosure and is hereby incorporated herein in its entirety. Embodiments of the present disclosure address these and other problems. In one embodiment of the present disclosure, the five piece metal energy absorber described in the background art section above may be replaced with a single injection molded plastic energy absorber having channels to absorb the forces acting on a person during a vehicle collision or other type of collision. In an exemplary embodiment, the energy absorber may be mounted to the backside of a lower portion of an instrument panel in an automotive vehicle. The energy absorber has lateral and longitudinal axes and includes a plurality of corrugations which are oriented to have walls which extend in the general direction of the lateral axis.

In one example, the energy absorber, according to the present disclosure, may be positioned along the backside of the instrument panel such that two of the channels may be positioned to correspond with the location on the instrument panel where it is anticipated that the knees of the driver or the front passenger will impact the instrument panel. These two channels may be attached to the back of the instrument panel through any means effective for securing the energy absorber including, but not limited to, mechanical fasteners, adhesives, heat stakes and the like. In some embodiments, the energy absorber may be integrally molded into the instrument panel. The two channels may extend from the back of the instrument panel towards a structural member attached to the frame of the vehicle. The structural member may serve as a relatively rigid structure against which the channels may collapse and deform during a collision. Any generally immobile and rigid structure may suffice.

The channels may be spaced apart from the structural member and need not be attached directly thereto. The channels may include an engagement feature such as a semicircular depression integrally molded into one or more of the channels. In other embodiments, the engagement feature may be any shape or configuration that is effective to engage with the structural member and to prevent the channels from slipping past the structural member during a collision. The engagement feature may be aligned with the structural member and positioned such that the impact of a person's knees with the instrument panel will force the channels towards the structural member and cause the engagement feature of each of the channels to engage the structural member.

Once the engagement features are engaged with the structural member, forward movement of the channels will be obstructed and the channels will begin to deform, for instance, bend, crush or crumple, in response to the force exerted by the knees of the person impacting the instrument panel. The deformation of the channels against the structural member may absorb the forces of impact and extend the forces acting on the knees over a longer period of time. Although the exemplary embodiment discussed herein relates to use with an automotive vehicle, it should be understood that the teachings of the present disclosure are not limited to use in an instrument panel of an automotive vehicle or to use with automotive vehicles. The energy absorbers disclosed herein may be widely applicable to various implementations including use in all sorts of vehicles and equipment.

In some embodiments, the energy absorber may be "tuned" to provide a desired level of resistance to impact forces. For example, the lateral walls of the channels may have openings or windows extending therethrough. By removing the material that would otherwise occupy this space, the strength and resistance to deformation, for instance, bending, crushing or crumpling, of the channels can be modified as desired. Additionally, walls that are transverse to the primary laterally extending walls of the channel (in other words, substantially longitudinal) may be added thus providing a further connection between the primary walls and thereby increasing the resistance of the channels to impact forces. These transverse walls may have openings or windows defined therein to allow for further "tuning" the energy absorber's resistance to impact forces.

Further "tuning" of the energy absorber may be possible to allow different portions of the energy absorber to provide differing levels of resistance to impact forces. For example, the use of a transverse wall on only one side of a channel may leave the channel stronger or more resistant to crumpling on the side where the transverse wall is located as compared with the opposite side of the channel where no transverse wall has been attached. Additionally, the opening or window in the primary walls of the channel may be positioned such that a center of the opening or window may be closer to one side of the channel and remote from the other. This off-center positioning of the window opening will make the side of the channel that is closer to the center point of the window/opening weaker than the side of the channel that is remote from the center point of the window/opening. Placing a transverse wall along one side of a channel and defining an opening closer to the other side of the channel permits even greater latitude in designing energy absorbers having a differing resistance to impact along the energy absorber's lateral axis.

Still further "tuning" of the energy absorber of the present disclosure may be possible by varying the height, length and thickness and number of the channels. Varying the height of one channel relative to an adjacent channel may allow a stepped impact response as opposed to a gradual response, and may allow for greater penetration of the knees, or other body part, before the resistance is increased. Varying the length (laterally) and number (longitudinally) of channels may allow the impact protection to be spread over a larger area, and combined with the other tuning factors described herein, may allow local tuning to address out of position occupants.

A significant factor in "tuning" is the material(s) that the energy absorber may be constructed of. In a variation of the present embodiment, mounting members and channels may be formed into a single piece (i.e., monolithic). Moreover, the mounting members and channels may be formed from a variety of materials such as plastics, metals, and combinations thereof. Plastics are particularly useful for forming energy absorbers according to the present disclosure because they can be relatively rapidly molded into complex shapes with varying thickness, including openings, straps, ribs, additional walls, etc. in a single operation. Further, plastics are of relatively light weight and may have metal reinforcements insert-molded into their construction. Such a molding operation may employ injection and compression molding. Suitable plastics may include thermoplastic and thermosetting resins. Examples of useful resins may include thermoplastic olefins, polyvinyl chloride, polypropylene, polyurethane and combinations thereof. More specific examples from which energy absorbers may be formed are homopolymers and copolymers of polyethylene, homopolymers and copolymers of polypropylene, thermoplastic olefins, thermoplastic urethanes, polycarbonate, acrylonitrile butadiene styrene, blends of acrylonitrile butadiene styrene and polycarbonate, and other combinations thereof. Additionally, the plastic resins used in the manufacture of the subject energy absorber may be reinforced with fibers, particles and other fillers to further tailor such properties as stiffness (modulus), elongation, density and tear strength. In a further refinement of this embodiment, the energy absorbers of the present disclosure may generally be from about 1.5 to about 4 mm in thickness and the channels may be in a sequence and separated by a distance of about 50 to about 200 mm. Further, the inside radii at the corners may be from about 1-2 mm. and the outside radii at the corners from about 2-10 mm.

Using the above described methods and principles, an energy absorber may be designed and mounted to the instrument panel such that the portion of the energy absorber that offers the greatest resistance to an impact force may be positioned proximate a portion of the instrument panel that will be impacted by a person having a greater height and/or weight, while the portion of the energy absorber that is least resistant to impact forces may be positioned proximate an area of the instrument panel where a person having a smaller height and weight may impact the instrument panel.

Figure 1:
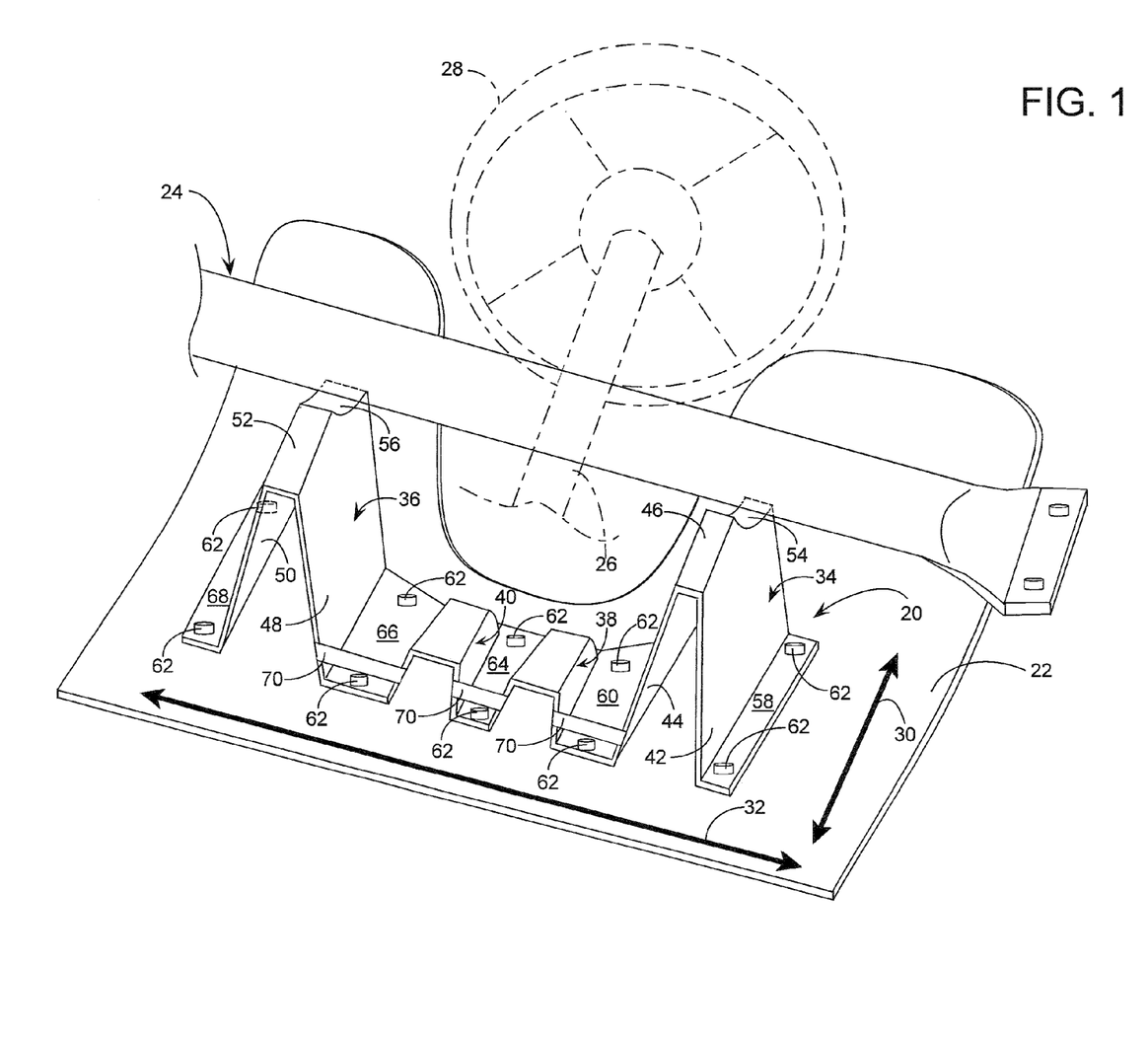
FIG. 1 is a perspective view illustrating an embodiment of an energy absorber made in accordance with the teachings of the present disclosure mounted to the backside of a vehicle's instrument panel.
Figure 2:
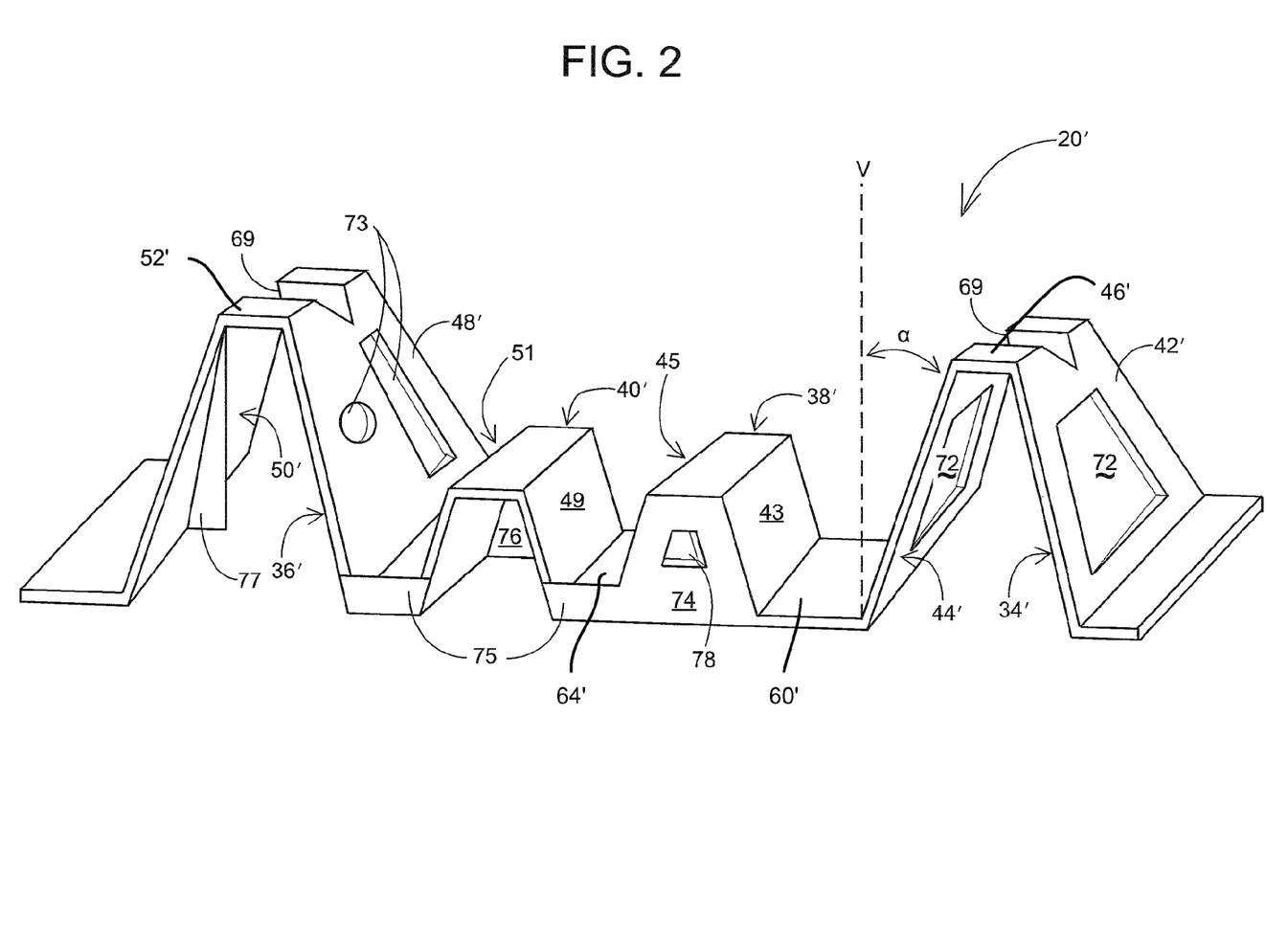
FIG. 2 illustrates the energy absorber of FIG. 1 with various features added or deleted, the features included to demonstrate means for tuning the impact resistance of that energy absorber.
Figure 3A:
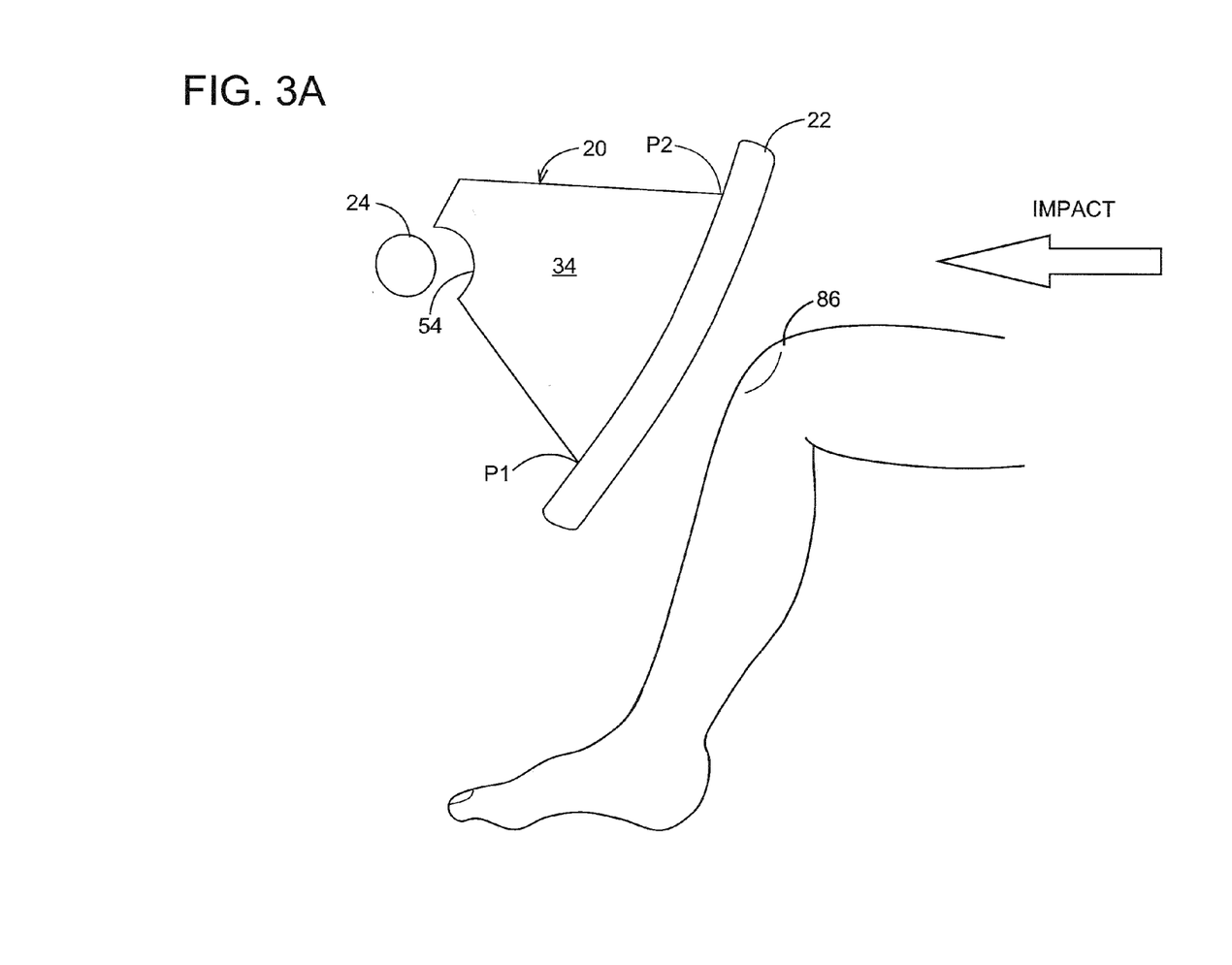
FIGS. 3A and 3B are schematic side views illustrating the energy absorber according to the present disclosure, before and during impact of an occupant's knees during a vehicle collision.

With respect to FIG. 1, an energy absorber 20 is illustrated mounted to the back portion of an instrument panel 22 positioned in the front of a vehicle proximate a driver's knees (see FIG. 3A). A cross member 24 is also illustrated. Cross member 24 is a structural element attached directly or indirectly to the frame of a vehicle. Structural element 24 may provide support for steering column 26 which in turn may support steering wheel 28. While, in the illustrated embodiment, energy absorber 20 is configured to engage cross member 24, it should be understood that any other substantially rigid member connected to the frame of the vehicle may also serve as a relatively rigid backstop or brace for energy absorber 20. Energy absorber 20 may comprise an elongate member having a lateral axis 30 and a longitudinal axis 32 as indicated. Energy absorber 20 may include a plurality of a first type of channels including first channel 34, second channel 36. The energy absorber 20 also may include a plurality of a second type of channels, or intermediate channels 38 and 40. These channels may be of a different height and length relative to the cross member 24 and may engage the cross member 24 at a later time during the impact event (intrusion of the knees) to allow further absorption of energy as the knees further deflect the instrument panel 22 towards the cross member 24. First channel 34 may includes a first wall 42, a second wall 44 and an upper surface 46. Similarly, second channel 36 may include first wall 48, second wall 50 and upper surface 52. Each of the first walls 42, 48 and second walls 44, 50 may be angled relative to a vertical plane V which may extend upwardly from the plane of the mounting members 58, 68 towards the plane of the upper surfaces 46, 52, respectively at an angle α generally other than vertical (see FIG. 2 for illustration). In some embodiments, this angle α may range from 0 degrees to approximately 45 degrees, preferably 5-30 degrees. Accordingly, in some embodiments, first and second upright walls 42, 44 may be vertical.

As used herein, "channel" refers to a long ridge or inverted generally U-shaped section of material where the length is generally greater than the width, as shown in simplified form below. Adjacent channels 34, 38, 40, 36 may be connected together by mounting members 60, 64, 66 (see FIG. 1).

Upper surfaces 46, 52 may each include an engagement feature 54, 56, respectively; in contrast, the intermediate channels 38, 40 may not. In the illustrated embodiment, engagement features 54, 56 may be semicircular depressions, as shown, defined in upper surface 46, 52, respectively which may have a shape that is complementary to the area of the cross member 24 that the depression may engage with. Engagement features 54, 56 are configured to "catch" cross member 24 during an impact when a vehicle occupant's knees may drive first and second channels 34, 36 in a forward (in-car) direction. As used here, the term "forward direction" means towards the front of the vehicle. In other embodiments, the engagement features may take different forms depending on the shape of the cross member or structural member of the vehicle that the engagement features will contact during impact. Typically, the engagement features may have a shape that can conform to an outer surface of the structural cross member so that it conforms to and mates with the structural member on engagement. This may allow the impact force to be concentrated in the channels and at least some of the force absorbed when the channels plastically deform. In still other embodiments, engagement features 54, 56 may comprise separately fabricated structures mounted to upper surfaces 46, 52 or to the cross member 24.

As used herein, "engagement feature" refers to the shape of all or a portion of the upper surface of a channel which may be configured to engage a structural member such that all or a portion of the forces of impact may be transferred to that structural member by contact with the engagement feature of the upper surface.

As used herein, "structural member" refers to a relatively rigid structure in the vehicle against which the channels may collapse and deform during a collision. Generally the rigid structure may be connected directly or indirectly to the body of the vehicle.

As illustrated in FIG. 1, energy absorber 20 may be attached to the backside of instrument panel 22 and may be located between the backside of the instrument panel and cross member 24. By configuring the upper surfaces of first and second channels 34 and 36 to include engagement features 54, 56, the need to attach first and second channels 34, 36 to cross member 24 may be eliminated thus reducing the complexity of installation of energy absorber 20 and reducing the labor needed for such installation. In other embodiments, engagement features 54, 56 may be configured to surround or attach to cross member 24, as desired, without departing from the teachings of the present disclosure.

Adjacent each channel there may be a generally planar mounting member. For example, in FIG. 1, on either side of first channel 34 are mounting members 58 and 60. Mounting members 58 and 60 may include openings to receive threaded fasteners 62 which mechanically connect first channel 34 of energy absorber 20 to instrument panel 22. Similarly, second channel 36 may be attached to instrument panel 22 through threaded fasteners 62 securing mounting members 66 and 68 to instrument panel 22. In the same way, mounting members 60 and 64 may attach intermediate channel 38 to instrument panel 22 and mounting members 64 and 66 may be used to attach intermediate channel 40 to instrument panel 22. Attachment may be accomplished via mechanical fasteners, welding means (heat staking, vibration welding, sonic welding) or adhesive means. The openings for such attachment may generally be located at or near the edges of the energy absorber.

In the illustrated embodiment, the channels may be further connected to one another through straps 70 which may extend between the upright walls of adjacent channels. Straps 70 provide structural support for a central portion of energy absorber 20. In the event that the vehicle is involved in an offset, front end collision causing the driver or front passenger's knees to strike instrument panel 22 at an oblique angle and one of the occupant's knees strikes instrument panel 22 proximate intermediate channels 38 and 40, straps 70 may permit the impact force from the occupant's knee to be transmitted through the intermediate channels 38 and 40 to the first and the second channels 34, 36. Moreover, connecting the first and second channels 34, 36 to the intermediate channels 38, 40 by straps 70 may allow some of the impact force to be absorbed by each of the channels 34, 36, 38, 40. In this way, the intermediate channels 38, 40 may be shorter than the first and second channels 34, 36, and they may be configured without engagement features such as the engagement features 54, 56. This may reduce material and manufacturing cost, while still allowing the intermediate channels 38, 40 to assist in the absorption of energy.

FIG. 2 is an expanded perspective of an energy absorber 20' similar to that illustrated in FIG. 1 wherein the environment of FIG. 1 has been excluded to provide a greater focus on energy absorber 20'.

With respect to FIG. 2, energy absorber 20' includes openings 72 extending through walls 42', 44' of channel 34'. Similar openings can be provided in any or all of the adjacent channels, such as intermediate channels 38' and 40', as desired. By removing material from these walls, first channel 34' may be weakened and offer a reduced resistance to deformation from impact forces. By including opening 72 in the walls of first channel 34', the impact resistance of energy absorber 20' can be tuned to provide an appropriate amount of resistance to impact forces anticipated in a collision without providing too much resistance such that energy absorber 20' itself would cause injury to the vehicle occupant. In channel 34' illustrated in FIG. 2, openings/windows 72 may generally be centered within the walls in which they are defined. The size of openings/windows 72 may have an effect on the ability of first channel 34' to resist impact forces. For example, the larger the opening/window 72, the less resistance first channel 34' will offer to deformation due to impact forces. It is contemplated that the use of openings in the walls of the absorber may be used as a "tuning" aid so that the desired amount of resistance/deformation may be built into the absorber to accommodate a relatively wide variety of occupant sizes and weights, a relatively wide range of angles of impact and a relatively wide range of impact speeds. Further, as shown in FIGS. 1 and 2, it is contemplated that none, some or all of the walls and top surfaces or mounting members of the channels disclosed herein may include one or more openings of nearly any shape to aid in tuning the performance of the absorber.

FIG. 2 also illustrates a further embodiment of energy absorber 20' wherein windows/openings 73 defined in walls 48' of channel 36' may be off-center. As illustrated, openings 73 may be laterally offset from the center of the respective wall. By positioning openings/windows 73 laterally closer to one end of channel 36', an energy absorber having a laterally varying resistance to impact can be created. For instance, the energy absorber 20' of FIG. 2 will offer less resistance to impact acting on the laterally distant end (from the perspective of FIG. 2 of channel 36') than the resistance it offers impact forces acting on the laterally proximal end.

FIG. 2 also illustrates an additional means to further vary the resistance offered by energy absorber 20'. As illustrated, channels 38', 40' each include a respective third wall 74, 76 extending along the longitudinal axis 32 of energy absorber 20'. Third wall 74 connects wall 43 to wall 45. Similarly, third wall 76 connects wall 49 to wall 51 but lies within the channel rather than at one end. In the embodiment, first channels 34' may remain unreinforced or open at the respective laterally distant ends or center and thus comprise an open structure having a generally rectangular upper surface and two generally upright walls on two sides of the generally rectangular upper surface. Walls 74, 76 provide additional support and crumple resistance to channels 38', 40'. The absence of fourth walls positioned opposite third walls 74, 76 allows energy absorber 20' to provide a greater resistance to impact at one lateral end and a lesser resistance to impact at the opposite lateral end. Further, channel 36' illustrates the use of a rib 77 inside the channel that does not connect walls 48', 50'. This type of rib provides the ability for further tuning and may even connect one channel to an adjacent channel (for instance, connecting wall 48' to wall 51) running with the longitudinal axis of the absorber 20'.

FIG. 2 further illustrates the use of flanges 75 along an edge of mounting members 60', 64' which may provide another means to tune the rigidity of the absorber 20'. Such flanges may stiffen the edge of the absorber longitudinally and may allow for fewer fasteners to be used (for instance, between every other channel or only at the ends of the absorber 20').

Additionally in FIG. 2, there is illustrated another feature 69 which may comprise a depression in the top surfaces 46', 52' of channels 34', 36' as an engagement feature (similar to features 54, 56 in FIG. 1) to engage the cross member (not shown) and ensure engagement and continued contact between the top surfaces of the channels and the member. While the depressions 69 are shown as triangular in shape in FIG. 2, any shape may be used which positively engages with the cross member and preferably is complementary in shape to the cross member in the region of engagement.

With further respect to FIG. 2, an opening or window 78 may be included in third wall 74. In this embodiment, the laterally proximal portion of channel 38' may offer less resistance to impact than the center portion of channel 40' which does not include an opening. By varying the size of opening 78, the lateral resistance to impact forces of energy absorber 20' can be tuned.

With respect to any of the walls and openings of the present disclosure, it is contemplated that such longitudinal walls, ribs and straps may extend between any of the lateral walls of a channel or even between channels. Such walls may each or all include openings of any shape and size and location to allow tuning of the impact resistance of the energy absorber 20, 20'

Figure 3B:
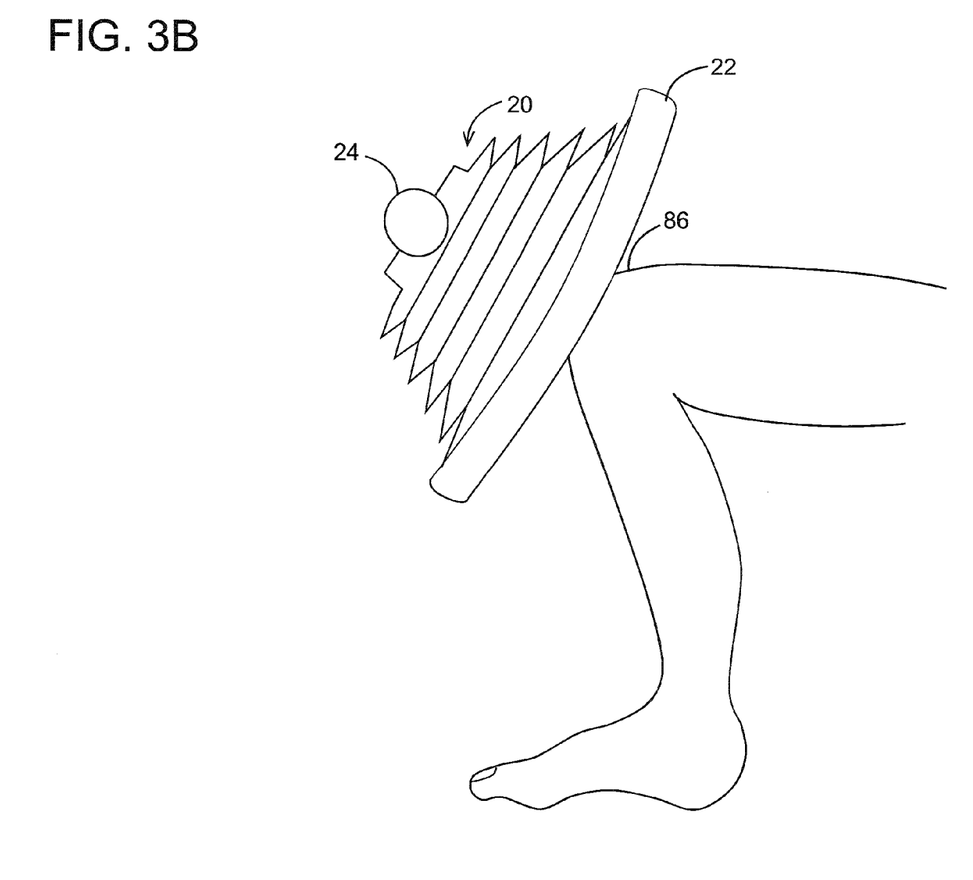

FIGS. 3A and 3B are schematic views illustrating the positioning of energy absorber 20 with respect to the knees 86 of a vehicle occupant. The relationship between engagement feature 54 and cross member 24 is also illustrated. FIG. 3A illustrates a side view of the energy absorber 20 attached to the backside of an instrument panel 22 and spaced from a cross member 24 prior to impact by an occupants knees 86. FIG. 3B illustrates a similar view of the energy absorbing system during impact where the knees 86 have engaged the instrument panel 22 and it has moved forward to the extent that the energy absorber 20 has engaged the cross member 24. In this view, it is evident that as energy absorber 20 is driven forward by knees 86 during the collision, engagement feature 54 will "catch" cross member 24 and that this engagement will permit the first channel 34 of energy absorber 20 to deform and crumple. In embodiments of energy absorber 20 that are "tuned" to provide a laterally (with respect to the energy absorber) varying degree of resistance to impact, the more resistant lateral portion of such an energy absorber 20 may be positioned closer to P2 where it is anticipated that the knees 86 of $50^{th}$ percentile occupants may impact energy absorber 20. Conversely, the softer, less resistant lateral end of energy absorber 20 may be disposed at position P1 where it is anticipated that the knees of 86 of $5^{th}$ percentile occupants will impact energy absorber 20.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. An energy absorber for a vehicle having a structural member, the energy absorber comprising:

an elongate member configured to operate with an instrument panel, the elongate member having a lateral axis and a longitudinal axis, and including a first channel wherein the first channel comprises a generally planar upper surface and a pair of spaced apart laterally extending walls including an engagement feature disposed along the upper surface, the elongate member further including at least one mounting member configured to facilitate attachment of the first channel to a portion of the vehicle such that the engagement feature is disposed adjacent to the structural member, the engagement feature having a shape that complements an outer surface of the structural member, such that when an impact force causes contact between the structural member and the engagement feature, the engagement feature will conform to and engage the structural member and the first channel will at least partially deform to absorb at least a portion of the impact force; and wherein at least one wall of said pair of spaced apart laterally extending walls of said first channel includes at least one opening extending therethrough.

2. The energy absorber of claim 1, wherein the elongate member further includes an intermediate channel wherein the intermediate channel comprises a generally planar upper surface and a pair of spaced apart laterally extending walls and is disposed adjacent the first channel and connected by a mounting member, the intermediate channel being shorter in height than the first channel and configured without an engagement feature having a shape that complements the outer surface of the structural member.

3. The energy absorber of claim 2, further comprising a plurality of the first channels disposed in relation to each other such that the intermediate channel is disposed between two of the first channels.

4. The energy absorber of claim 1, further comprising one or more channels in addition to the first channel to provide a plurality of channels, wherein at least two of the channels are separated by the mounting member.

5. The energy absorber of claim 1, further comprising a plurality of the mounting members, each of which is attached to a respective one of the laterally extending walls and at least one of which is configured to receive a fastener along an outer edge to secure the respective mounting member to a portion of the vehicle.

6. The energy absorber of claim 1, wherein the at least one opening is asymmetrical.

7. The energy absorber of claim 1, wherein a center of at least one of the openings is spaced apart from a center of the respective wall in which the opening is included.

8. The energy absorber of claim 1, further comprising one or more channels in addition to the first channel to provide a plurality of channels, and at least one of the channels comprises at least one longitudinally oriented wall connecting two laterally extending walls.

9. The energy absorber of claim 8, wherein the longitudinally oriented wall includes an opening extending therethrough.

10. The energy absorber of claim 8, wherein the longitudinally oriented wall is located at an end of the two laterally extending walls.

11. The energy absorber of claim 8, wherein the longitudinally oriented wall is located intermediate between opposing ends of the two laterally extending walls.

12. The energy absorber of claim 8, wherein a longitudinally oriented flange connects one channel to an adjacent channel of the plurality of channels.

13. The energy absorber of claim 2, wherein a flange connects the mounting member, the first channel and the intermediate channel.

14. The energy absorber of claim 1, further comprising one or more channels in addition to the first channel to provide a plurality of channels, and at least one of the channels comprises at least one longitudinally oriented wall connecting two laterally extending walls and at least one of the channels comprises at least one through opening defined by at least one wall thereof.

15. The energy absorber of claim 14, wherein the laterally extending walls each include respective centers aligned with each other along an axis parallel to the longitudinal axis of the elongate member, and the through opening defines a respective center aligned along an axis parallel to the longitudinal axis of the elongate member and offset from the axis aligning the centers of the laterally extending walls.

16. The energy absorber of claim 1, wherein one or more of the spaced apart laterally extending walls of the first channel include a rib extending from one of the spaced apart laterally extending walls in the direction of the other of the spaced apart laterally extending walls.

17. The energy absorber of claim 1, wherein said attachment of the first channel to a portion of the vehicle comprises one or more of mechanical fastening, welding means or adhesive means.

18. The energy absorber of claim 1, wherein said spaced apart laterally extending walls form an angle α with a vertical plane V in the range of 0-45 degrees.

19. The energy absorber of claim 1, wherein said elongate member comprises one or more of plastic and metal.

20. The energy absorber of claim 19, wherein said elongate member comprises injection molded thermoplastic.

21. The energy absorber of claim 1, wherein said spaced apart walls of said first channel have a thickness in the range of about 1.5 mm. to about 4 mm.

22. The energy absorber of claim 4, wherein said plurality of channels are separated by about 50 mm. to about 200 mm.

23. An energy absorber for a vehicle having a structural member, the energy absorber comprising:

a plurality of channels configured to operate with an instrument panel, each of which is defined by a respective upper surface and at least two corresponding lateral walls extending from the respective upper surface and disposed opposite each other, at least one of the channels including an engagement feature disposed along a respective one of the upper surfaces, the engagement feature being geometrically configured to complement a corresponding outer geometry of the structural member such that when an impact force causes contact between the structural member and the engagement feature, the engagement feature will conform to and mate with the structural member and the channels will at least partially deform to absorb at least a portion of the impact force;

at least one mounting member positioned between the plurality of channels and configured to facilitate attachment of the channels to a portion of the vehicle such that the engagement feature is disposed at a distance from the structural member before an impact force causes contact between the structural member and the engagement feature; and wherein at least one wall of said laterals walls of at least one channel includes at least one opening extending therethrough.

24. The energy absorber of claim 1, wherein:

the structural member comprises a structural cross member.

25. The energy absorber of claim 24, wherein:

the structural cross member is positioned forward of an instrument panel when the instrument panel is installed in the vehicle.

* * * * *